(12) United States Patent
Lee et al.

(10) Patent No.: US 10,240,451 B2
(45) Date of Patent: Mar. 26, 2019

(54) DOWNHOLE TOMOGRAPHIC IMAGING

(71) Applicant: Halliburton Energy Services, Inc, Houston, TX (US)

(72) Inventors: Dongwon Lee, Kingwood, TX (US); Weijun Guo, Houston, TX (US); Sriram Srinivasan, Katy, TX (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 111 days.

(21) Appl. No.: 15/502,534

(22) PCT Filed: Oct. 2, 2014

(86) PCT No.: PCT/US2014/058866
§ 371 (c)(1),
(2) Date: Feb. 8, 2017

(87) PCT Pub. No.: WO2016/053344
PCT Pub. Date: Apr. 7, 2016

(65) Prior Publication Data
US 2017/0218749 A1     Aug. 3, 2017

(51) Int. Cl.
*G01V 5/08*     (2006.01)
*E21B 47/00*     (2012.01)
(Continued)

(52) U.S. Cl.
CPC ...... *E21B 47/0005* (2013.01); *E21B 47/0002* (2013.01); *G21K 1/02* (2013.01);
(Continued)

(58) Field of Classification Search
CPC .............................. G01V 5/104; G01V 5/107
See application file for complete search history.

(56) References Cited

U.S. PATENT DOCUMENTS 4,034,218 A    7/1977   Turcotte
4,618,765 A * 10/1986   Sonne ...................... G01V 5/12
                                                        250/269.3
(Continued)

FOREIGN PATENT DOCUMENTS

EP        1760495 A1    3/2007
EP        3063535 A1    9/2016
(Continued)

OTHER PUBLICATIONS

International Search Report and The Written Opinion of the International Search Authority, or the Declaration, dated Jun. 29, 2015, PCT/US2014/058866, 16 pages, ISA/KR.
(Continued)

*Primary Examiner* — Kenneth J Malkowski
(74) *Attorney, Agent, or Firm* — Haynes and Boone, LLP

(57) ABSTRACT

A tomographic imaging apparatus utilizes Compton backscattering to evaluate cement behind the casing. The imaging apparatus includes a slant-hole or pin-hole collimator coupled to a series of detectors in order to count the number of photons that backscatter off from the cement. The number of backscattered photons is proportional to the density of the cement behind the casing. Using the photon count, an image processing unit of the imaging apparatus generates a 2D or 3D tomographic image of the borehole.

18 Claims, 5 Drawing Sheets

(51) Int. Cl.
*G21K 1/02* (2006.01)
*E21B 33/14* (2006.01)
*G01V 5/10* (2006.01)

(52) U.S. Cl.
CPC ............ *E21B 33/14* (2013.01); *E21B 47/0006* (2013.01); *G01V 5/101* (2013.01)

(56) References Cited

U.S. PATENT DOCUMENTS

| | | |
|---|---|---|
| 4,825,454 A | 4/1989 | Annis et al. |
| 5,127,030 A | 6/1992 | Annis et al. |
| 5,847,384 A | 12/1998 | Mathis |
| 7,705,294 B2 | 4/2010 | Ramstad et al. |
| 8,138,471 B1 | 3/2012 | Shedlock et al. |
| 8,742,329 B2 | 6/2014 | Korkin |
| 2003/0042426 A1* | 3/2003 | McGregor ............... G01V 5/02 250/393 |
| 2011/0307179 A1* | 12/2011 | Zhou ..................... G01V 5/125 702/8 |
| 2012/0138782 A1 | 6/2012 | Simon et al. |
| 2013/0206985 A1 | 8/2013 | Turner et al. |
| 2013/0268200 A1* | 10/2013 | Nikitin ................... G01V 5/125 702/8 |
| 2015/0177409 A1* | 6/2015 | Sofiienko ............... G01V 5/125 250/269.1 |

FOREIGN PATENT DOCUMENTS

EP  3126881 A1  2/2017
WO  WO 1997/033141 A1  9/1997

OTHER PUBLICATIONS

Teague, P.N., "Imaging of Backscattered Ionizing Radiation—A Key Enabler For Through Mud Borehole Imaging," Paper OTC-21667 presented at the 2011 Offshore Technology Conference, Houston, TX, May 2-5, 2011.
Supplementary European Search Report, dated Apr. 17, 2018, issued for EP 14903221.1, 10 pages.

* cited by examiner

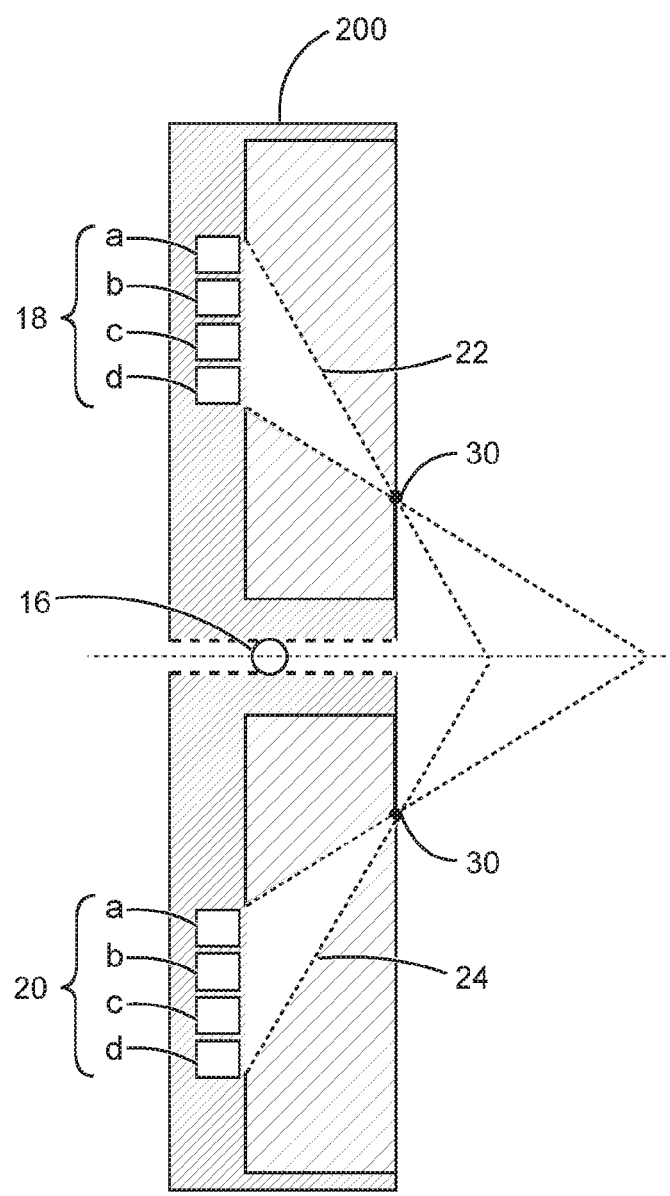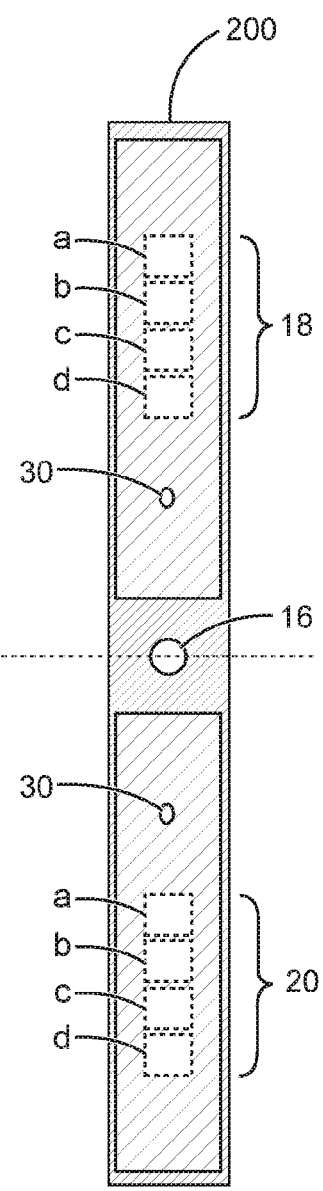
Fig. 2A                                    Fig. 2B

DOWNHOLE TOMOGRAPHIC IMAGING

PRIORITY

The present application is a U.S. National Stage patent application of International Patent Application No. PCT/US2014/058866, filed on Oct. 2, 2014, the benefit of which is claimed and the disclosure of which is incorporated herein by reference in its entirety.

FIELD OF THE DISCLOSURE

The present disclosure generally relates to downhole imaging and, more particularly, to downhole photon tomographic imaging.

BACKGROUND

In an oil and gas well, cement between the casing and borehole is designed to provide zonal isolation in the wellbore. However, liquid contaminants or defects created by volumes of inadequate density might lead to failed isolation, and fixing these defects can be expensive and difficult.

Therefore, methods and devices for detecting defects in the cement and analyzing the quality of the cement are important to the oil and gas industry. One technique commonly used is acoustic logging. Acoustic logging detects and assesses the cement behind the casing by measuring the acoustic impedance of the cement bonded to the casing. However, conventional acoustic tools are subject to important limitations. For example, acoustic decoupling can be caused by the presence of a micro-annulus or a shear film coating in the casing. A micro-annulus may allow the casing to move, thus breaking the bond between the cement and the casing. A micro-annulus may be partial or, in some instances, it may extend around the entire casing circumference, thereby possibly resulting in undesirable fluid communication between zones.

Another technique applied involves the use of ultrasonic imaging tools, which are based on pulse-echo techniques. However, such tools are limited when heavy mud or thick casing is used since the reflected signals decay very quickly. For example, the typical upper limit of the casing thickness allowable in pulse-echo ultrasonic measurement is about 0.59 inches (about 15 mm). Therefore, this technique is typically only suitable if the volume of interest is very close to the casing and strongly bonded to the reflective surfaces. Otherwise, such defects may go undetected Therefore, there is a need in the art for alternative improved techniques in which to detect defects behind the casing.

BRIEF DESCRIPTION OF THE DRAWINGS

FIGS. 2A and 2B are side and front views, respectively, of an imaging apparatus using a pin hole collimator, according to certain illustrative embodiments of the present disclosure;

DESCRIPTION OF ILLUSTRATIVE EMBODIMENTS

Figure 1A:
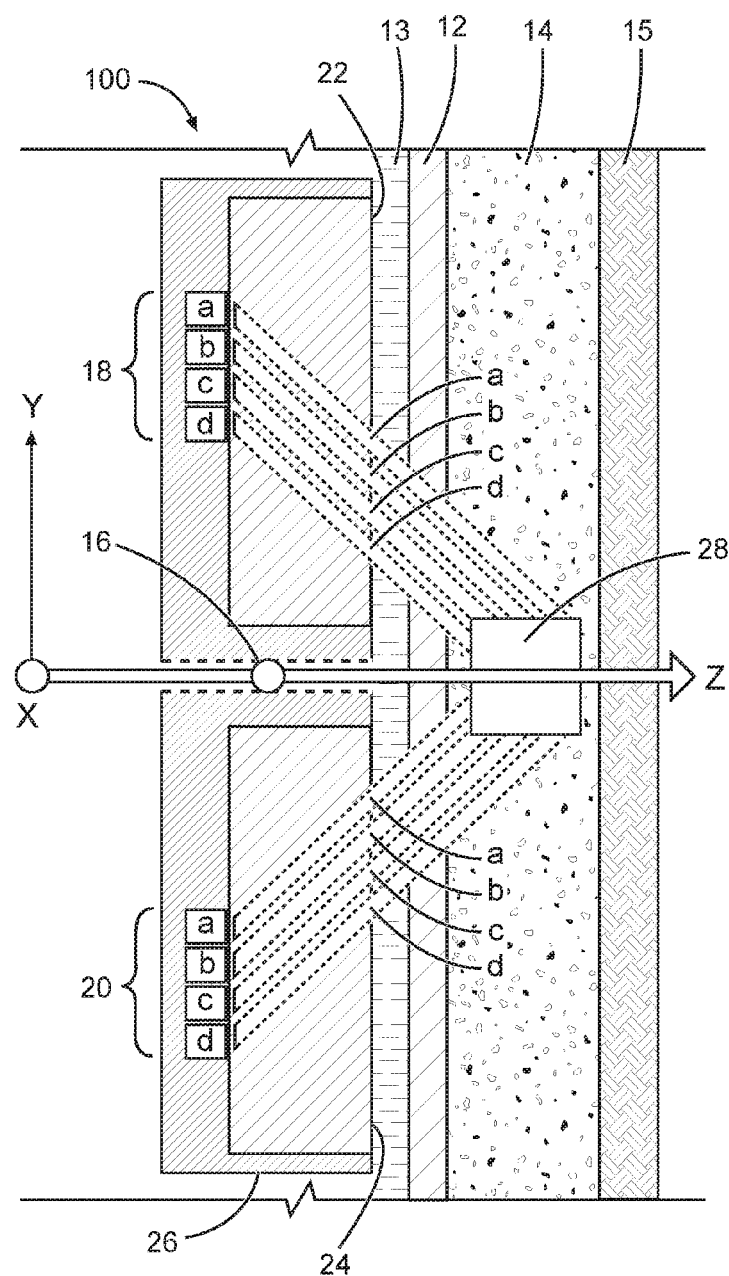
FIGS. 1A and 1B are side and front views, respectively, of an imaging apparatus using a slant-hole collimator, according to certain illustrative embodiments of the present disclosure.

Illustrative embodiments and related methodologies of the present disclosure are described below as they might be employed for downhole photon tomographic imaging. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the disclosure will become apparent from consideration of the following description and drawings.

As described herein, embodiments of the present disclosure utilize Compton backscattering to evaluate cement behind casing and thereby generate images of horizontal cross-sections (i.e., tomographic imaging) of a borehole whereby structural defects in the cement are detected. In Compton backscattering, the number of backscattered photons coming from an object placed in front of a photon source is a function of photon energy and the backscattering angle. The material properties of the object, such as the attenuation coefficient, and the thickness and density of the object may also affect the number of backscattered photons. Photon attenuation is given by the exponential question $I=I_0 e^{-\mu t}$ where $\mu$ is the linear attenuation coefficient, and t is a function of photon energy and the material's density and atomic number. The term $\mu$, is also defined by the sum of the probabilities of photoelectric absorption, Compton scattering and pair production per unit path length that the photon is removed from the beam. The number of backscattered photons depends on the density and length of travel path through the medium and the probability of backscattering at the defect, which is proportional to the atomic number and density of the defect. Thus, non-cement materials like air and water will result in fewer photon counts at the detector.

In downhole applications, the two dominant interactions are photoelectric absorption and Compton scattering. Compton scattering becomes dominant over photoelectric absorption when the photon energy is a few hundred kilo-electron volts (keV), for instance, 150-300 keV. In certain embodiments, the photon energy may be higher, however, for example about 662 keV for a cesium-137 source.

Accordingly, in a generalized embodiment of the present disclosure, the imaging apparatus utilizes a photon source to emit photons through a casing and into the cement behind casing. The energy of the emitted photons is selected to fall within the region where Compton scattering is dominant for the material being imaged. The apparatus also includes photon detectors coupled to slant-hole or pin-hole collimators, which enable counting of photons which backscatter off from the cement. The number of backscattered photons detected by the imaging apparatus would be proportional to the density of the cement surrounding the casing, assuming single Compton scattering occurs. Therefore, if the cement has a consistent density, the number of backscattered photons will remain the same; but if there is any density anomaly, the number of backscattered photons will vary, providing an assessment of the density variation in the cement behind the wellbore casing. Note also that the photon count is unaffected by micro-annuluses or thin coating layers of the casing, thereby allowing defects in the cement to be clearly manifested. Moreover, each photon detector corresponds to a different depth of investigation, thus providing data relating to the radial location of the defects.

Furthermore, the penetrating power of the photon source could be increased while maintaining the behavior of Compton scattering, thus enabling inspection of cement behind thick walled casing. During the detection process of this generalized embodiment, the imaging apparatus is rotated to create a two-dimensional ("2-D") tomographic image of the borehole, which provides azimuthal and radial information of any defects. In yet other embodiments, a three-dimensional ("3-D") image of the borehole can be created when the imaging apparatus is moved up or down along the borehole.

Figure 1B:
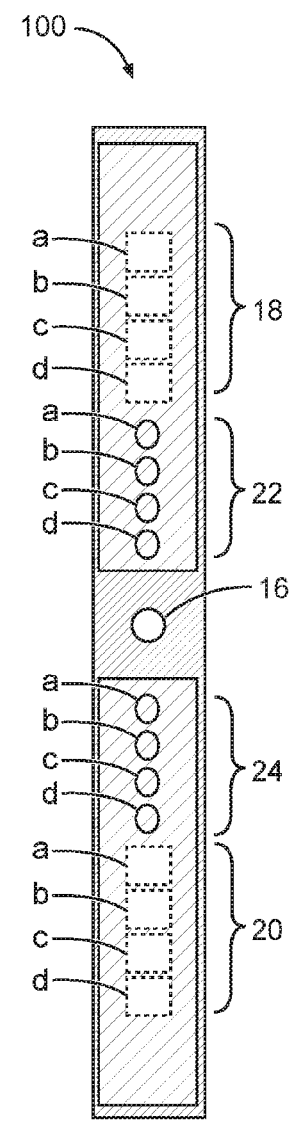

FIG. 1A illustrates a side view of an apparatus 100 for downhole tomographic imaging, according to certain illustrative embodiments of the present disclosure. FIG. 1B is a front view of apparatus 100. In this example, apparatus 100 may be assembled into a downhole tool which can be lowered into a wellbore casing 12 filled with fluid 13, with extends along a formation 15. Cement 14 is placed around casing 12 to provide zonal isolation. Apparatus 100 includes a photon source 16 which emits photons at one or more energy levels or over a broad range of energy levels. Examples of the photon source 16 include, for example, chemical sources, such as Cesium-137, induced gamma-rays from a neutron-induced source, namely, a material made radioactive through bombardment of neutron flux, or an electronic source, such as an x-ray tube. The photon flux may be a collimated or focused pencil beam used to define the volume of interest for imaging.

In this illustrative embodiment, imaging apparatus 100 further includes a first detector module 18 and second detector module 20, each including a plurality of photon detectors acting as scintillation devices to produce light signals in response to received photons. In this example, four detectors 18a-d and 20a-d are utilized. However, in alternate embodiments, more or less detectors and/or detector modules may be utilized. Examples of detectors 18a-d, 20a-d may be a gamma-ray scintillators or a thallium doped sodium iodide (NaI(Tl)) scintillators. Although not shown, each detector 18a-d, 20a-d is coupled to a photo-sensor. The photo-sensors are closely coupled to detectors 18a-d, 20a-d to prevent signal losses, as will be understood by those ordinarily skilled in the art having the benefit of this disclosure. Examples of photo sensors suitable in embodiments of the present disclosure include, for example, photomultiplier tubes ("PMT") or photodiodes. Other light sensing devices that can generate electrical signals in response to incident light received from detectors 18a-d, 20a-d may also be used in alternative embodiments of the apparatus 100 depicted in FIG. 1A.

As will be described in more detail below, each detector 18a-d, 20a-d is positioned to correspond to a different depth of investigation. First detector module 18 is coupled to a first detector collimator 22, while second detector module 20 is coupled to a second detector collimator 24. In this embodiment, first and second detector collimators 22, 24 are a plurality of slant holes 22a-d, 24a-d positioned at an angle to thereby direct backscattered photons to their corresponding detectors 18a-d, 20a-d. Although only four collimator holes are shown, other embodiments may utilize more or less in conjunction with their corresponding detectors. As a result, only single Compton backscattered photons traveling at the angle of slant holes 22a-d, 24a-d are detected by detectors 18a-d, 20a-d, while all other photons (those going through multiple Compton scattering) are rejected. The slanted nature of holes 22a-d, 24a-d provides one dimensional ("1-D") radial spectrum analysis of the backscattered photons.

As previously mentioned, the number of photon detectors 18a-d, 20a-d, and their corresponding slant hole collimators 22a-d, 24a-d, are used to alter the depth of investigation. As can be seen in FIG. 1A, each photon detector 18a-d, 20a-d, and its corresponding slant hole collimators 22a-d, 24a-d has a different radial depth of investigation along the z-axis. Therefore, the depth of investigation may be increased by stacking up more detectors 18a-d, 20a-d and corresponding slant-holes 22a-d, 24a-d that detect the backscattered photons from the extended zone of investigation.

In certain illustrative embodiments, housing 26 of imaging apparatus 100 is positioned within the side wall of a larger tubular-shaped tool (as illustrated in FIG. 1A). In other embodiments, however, imaging apparatus 100 may be a standalone tool deployed along a wireline or downhole assembly, such as, for example, a logging while drilling assembly or some other downhole interrogation device. Nevertheless, housing 26 houses photon source 16, first and second detector modules 18, 20 and first and second detector collimators 22, 24. In one embodiment, housing 26 is made of shielding material to prevent emitted photons from directly hitting first and second detector modules 18, 20 directly. The material may have a high atomic number (high-Z), including lead, tantalum and tungsten. This prevents detection of photons that were not backscattered from the area of interest in the cement (or the casing and/or mud) being analyzed from generating unwanted noise in the photo sensors.

As previously mentioned, first and second detector collimators 22, 24 each include a plurality of slant holes 22a-d, 24a-d which provide a pathway for photons backscattered from a defect in the area of interest in cement 14 to reach the photo detectors 18a-d, 20a-d. Thus, the shielding is designed to restrict the photons detected by detectors 18a-d, 20a-d to the photons that indicate a defect of some sort in the cement, mud or casing, and eliminate unwanted photons that are only a source of noise. Additionally, first and second detector collimators 22, 24 may further the backscatter angle of the photons that the photon detector can receive. As a result, the imaging apparatus 100 is capable of determining the minimum size of the structural anomaly/defect that apparatus 100 may identify. In one embodiment, first and second detector collimators 22, 24 are designed with a geometry that restricts the detection parameters to those photons generated by a single Compton backscattering and from a preselected backscatter angle, while rejecting photons that go through multiple Compton scatterings as much as possible.

First and second detector modules 18, 20 work to detect those photons that have experienced single scattering by using a tight collimator openings (e.g., slant holes 22a-d, 24a-d). In one embodiment, slant holes 22a-d, 24a-d will match the size of a detector pixel, such as 1 cm×1 cm. In other embodiments, slant holes 22a-d, 24a-d could be even smaller, such as a 1 mm square area, which would increase resolution. Selecting a suitable size and shape for each slant holes 22a-d, 24a-d will be within the capabilities of a person ordinarily skilled in the art depending on the design requirements specified for the tool. As described above, when Compton scattering is dominant and in the case of single Compton scattering, the number of backscattered and detected photons is proportional to the material density of an object (e.g., defect 28) in front of a photon source. The backscatter detection angle for slant holes 22a-d, 24a-d will depend on the application's geometry and may be determined as a matter of design choice. In one embodiment, the backscatter angle may range from about 150 to about 120 degrees.

In this embodiment, photon source 16 is positioned in the middle of housing 26, and first and second detector modules 18, 20 are positioned above and below photon source 16 in a symmetrical fashion with respect to the back side of photon source 16. As a result, first and second detector modules 18, 20 only receive backscattered photons emitted by photon source 16. To receive sufficient counts of backscattered photons for assessing the quality of a target object, photon detectors 18a-d, 20a-d may be placed close to photon source 16, such as within 4-6 inches. As detectors 18a-d, 20a-d are placed further from source 16, the number of detected backscattered photons may be too low to be practical. The number of photons detected should be sufficient so that the statistical uncertainty (measured, for example, by the rms value of the count) drops below a selected threshold level, such as 1% of the count. The measurement time may be varied to achieve the desired threshold.

Although not shown, imaging apparatus 100 also includes an image processing unit that generates a tomographic image of the wellbore based upon the detected photons, as will be described in more detail below. The image processing unit may be, for example, FPGA (Field Programmable Gate Array) or ASIC (Application Specific Integrated Circuit). As the backscattered photon counts are acquired, the data is communicated to the imaging apparatus for further processing and generation of the tomographic images. During operation, the slant hole design of pin holes 22a-d, 24a-d provides one dimensional ("1-D") radial spectrum of the backscattered photons and rotation of the entire imaging apparatus 100 provides circumferential scans to create the 2-D tomographic images of the borehole.

In certain embodiments, the image processing unit may be remotely located from apparatus 100, while in other embodiments, the image processing unit may be on-board apparatus 100. Furthermore, it will be understood by those ordinarily skilled persons described herein that the techniques described herein may be performed by processing circuitry onboard apparatus 100 or located at some remote location. In either case, such processing circuitry would comprise a signal processor, communications module and other circuitry necessary to achieve the objectives of the present disclosure. In addition, it will also be recognized that the software instructions necessary to carry out the objectives of the present disclosure may be stored within storage located within the processing circuitry or loaded into that storage from a CD-ROM or other appropriate storage media via wired or wireless methods. Such software and processing circuitry will enable the processing/counting of the backscattered photons. If the processing circuitry is remotely located, a suitable wired or wireless communications link may provide a medium of communication between the processing circuitry and the sensing module. Alternatively, however, the communications link may be an electromagnetic device of suitable frequency, or other methods including acoustic communication and like devices.

Accordingly, in this illustrative embodiment, imaging apparatus 100 is utilized to detect material density anomalies behind wellbore casing 12. In one embodiment, if there is a defect in the cement 14, such as defect 28 filled with fluid or water as illustrated in FIG. 1A, the number of the photons backscattered from the region of defect 28 and detected by photon detectors 18a-d, 20a-d will be reduced, since the defect 28 has a lower material density compared with the cement. Based on the reduced number of backscattered photons, apparatus 100 identifies defect 28 and determines its location. Of course, it will be understood that while most defects will reduce the photon count, it is possible that some defects, such a metal bolt or nut stuck in the cement, could actually increase the photon count.

FIGS. 2A and 2B illustrate a side and front view, respectively, of imaging apparatus 200, according to an alternate embodiment of the present disclosure. Imaging apparatus 200 is somewhat similar to imaging apparatus 100 described with reference to FIGS. 1A and 1B and, therefore, may be best understood with reference thereto, where like numerals indicate like elements. However, imaging apparatus 200 utilizes pin holes 30 as the first and second detector collimators 22, 24. As shown, each pin hole 30 in the collimator body includes a conical shaped channel that guides the backscattered photons off from the area of interest and toward all detectors 18a-d, 20a-d. Hence, the detector responses coupled to their corresponding pin-holes or slant holes (FIGS. 1A-1B) are input by the processing circuitry of apparatus 200 into a radial spectrum (or density profile), where the backscattered photon counts as a function of photon beam travel path along Z-axis.

As will be understood by those ordinarily skilled in the art having the benefit of this disclosure, the depth of investigation of imaging apparatus 200 may be adjusted by changing the distance between photon detectors 18a-d, 20a-d and pin holes 30 and the region of investigation could be shifted by changing the position of the pin holes 30 vertically along the housing of imaging apparatus 200.

Figure 3A:
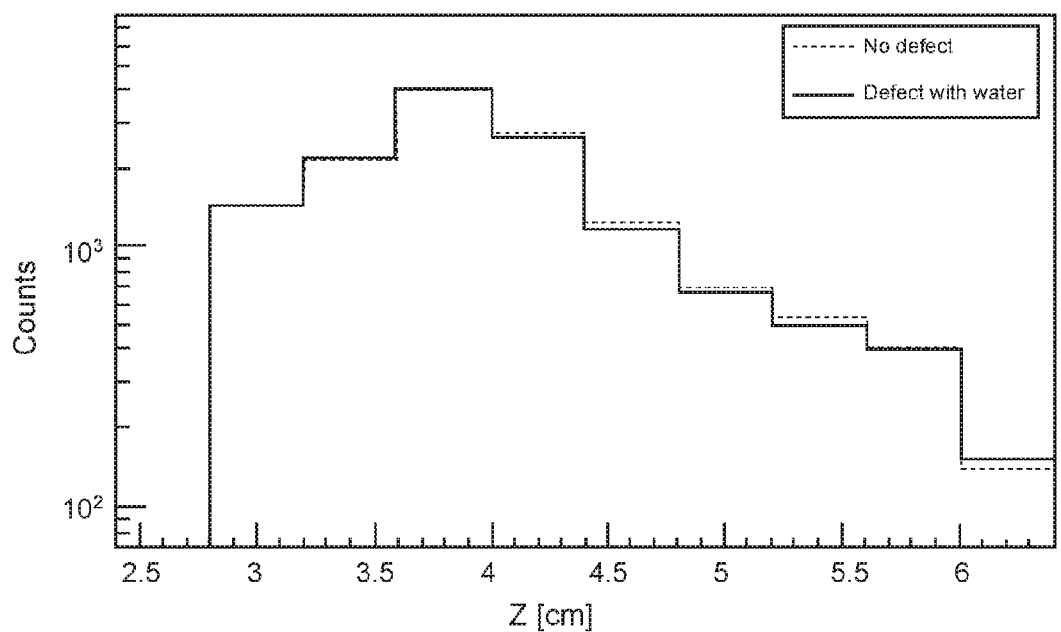
FIG. 3A is a graph of a radial spectrum showing a defect filled with water behind the steel casing, according to certain illustrative methods of the present disclosure.
Figure 3B:
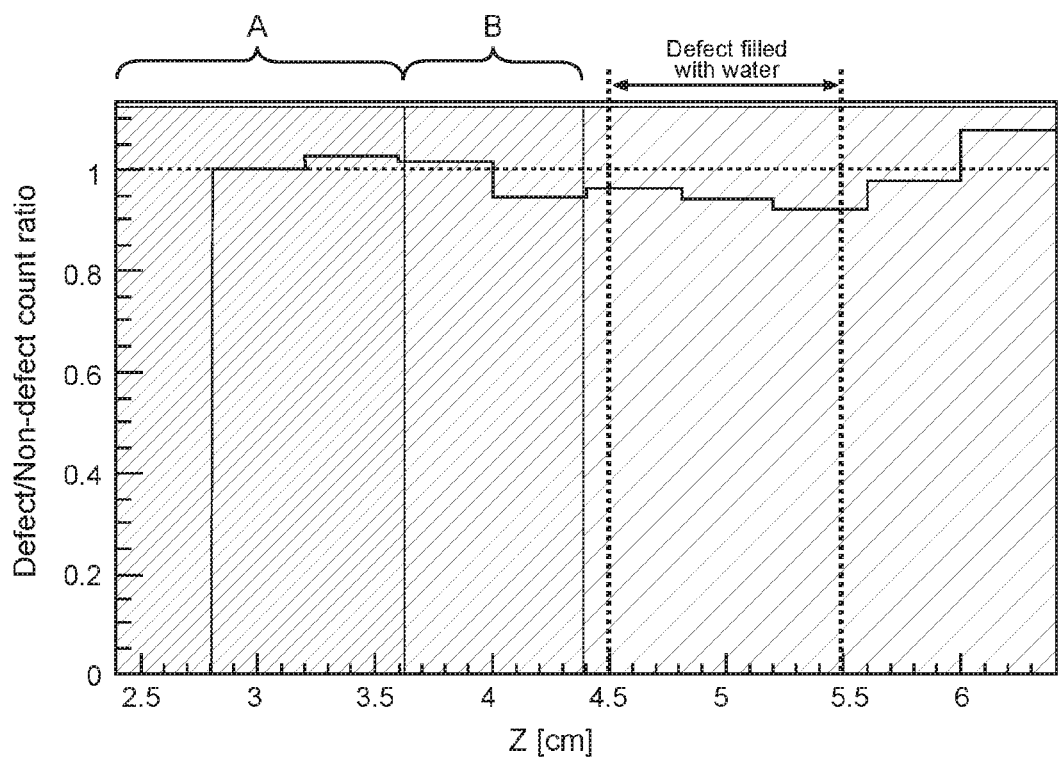
FIG. 3B is a radial spectrum with the water defect normalized by the spectrum without the defect in FIG. 3A.

FIG. 3A is a graph of a radial spectrum showing a defect filled with water behind the steel casing, and one without such a defect. FIG. 3B is a radial spectrum with the water defect normalized by the spectrum without the defect in FIG. 3A. These two spectra may not be easily distinguished from each other, but the differences become clear when the spectrum with the defect is normalized by the spectrum without the defect. The spectrum without any defect is the "reference spectrum". In an illustrative method of the present disclosure, once the reference spectrum is obtained either from a borehole in the field with nominal structural configuration or from an ideal laboratory calibration setup, newly obtained radial spectra are normalized by the reference spectrum to reveal any anomalies. In this example, the defect was placed at 5 cm from the surface of the detector and the region with reduced photon counts is observed around 5 cm along Z-axis (FIG. 3B). Also, regions A and B in FIG. 3B represent a water gap and steel casing, respectively. In this example, the dimensions of the defect were found to be 1.0 cm×1.0 cm×1.0 cm.

Figure 4:
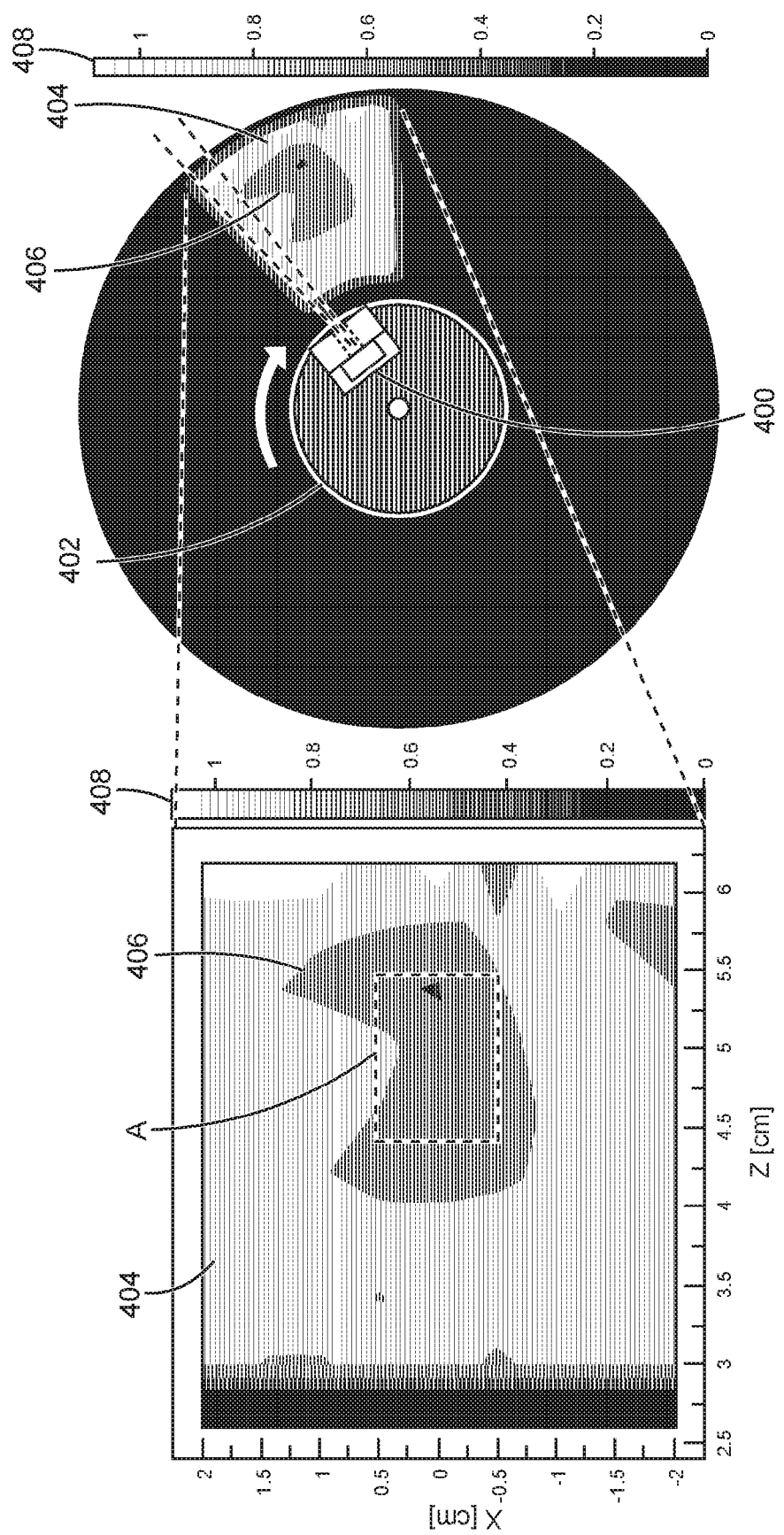
FIG. 4 illustrates a 2-D segment of a simulated tomographic image of a borehole, in accordance to an illustrative method of the present disclosure.

Each scan with the pencil photon beam only covers a fraction of the complete circumference of the borehole and the imaging apparatus is rotated to sweep different regions. Hence, a collection of repeated scans from a rotating tool is visualized as a 2-D image after the spectrum normalization process mentioned above. A portion of the simulated full 2-D image generated by the imaging apparatus is shown in FIG. 4 and the water defect in the cement is clearly observed in this tomographic image of the borehole. Here imaging apparatus 400 is simulated as being deployed into the bore hole 402 and rotated as indicated by the arrow. Monte Carlo simulations were performed with the photon energy of 300 keV and a water defect of a volume of 1 cm$^3$ was placed right behind of the casing. The size of the photon beam spot was set to 0.5×0.5 cm$^2$. The detector responses coupled to the slant-hole or pin-hole collimator provides the material density behind the steel casing as a function of depth.

In FIG. 4, a 2-D segment 404 of the simulated tomographic image of borehole 402 is shown. In the simulations, imaging apparatus 400 was rotated to scan a total of 35° in azimuthal angle around the region with the water defect 406. 2-D cross-section 404 of the borehole shows the water defect 406 with reduced counts due to lower density. The apparatus is placed inside the tool body and the tool is rotated to sweep the circumference of borehole 402. The zoomed-in image of the scanned sections 404 is shown in the graph (left) and the dashed lined box A represents the size of water defect 406. The measured spectrum is normalized to the reference spectrum and such relative intensities are presented in these plots as defined by the gradient charts 408 to the right. The lower or higher value than unity means the measured spectrum has decreased or increased number of photon counts compared to the reference spectrum.

Figure 5:
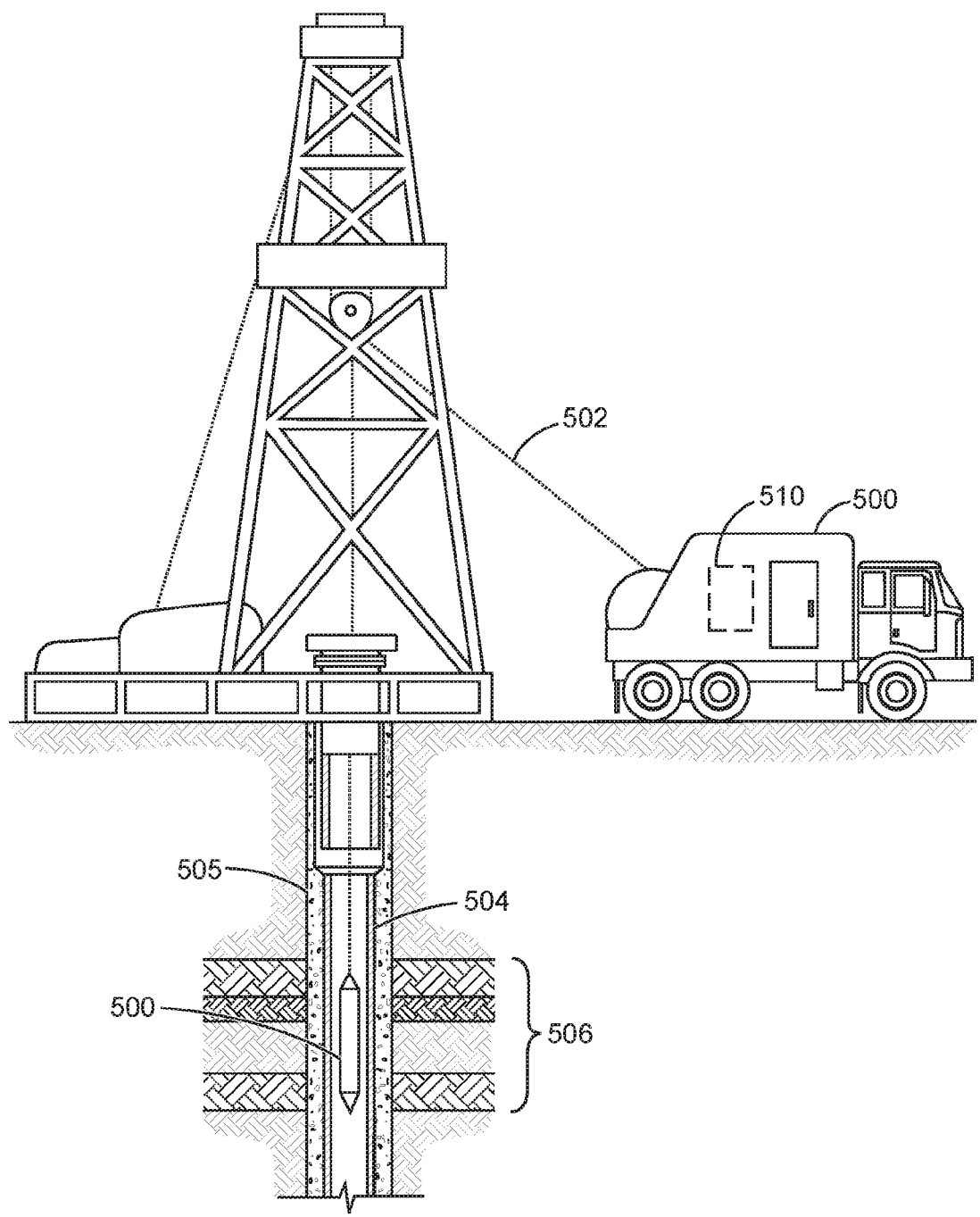
FIG. 5 illustrates an embodiment of the present disclosure whereby an imaging apparatus is utilized in a wireline application.

FIG. 5 illustrates an embodiment of the present disclosure whereby an imaging apparatus 500 is utilized in a wireline application. Here, an imaging apparatus 500 is positioned along a cased wellbore 504 having cement 505 behind it. Imaging apparatus 500 has been suspended along formation layers 506 by a cable 502 having conductors for transporting power to imaging apparatus 500 and/or telemetry to/from imaging apparatus 500 and the surface. In such a deployment, imaging apparatus 500 is utilized to detect defects behind the casing (e.g., cement defects), as described herein. Once imaging apparatus 500 has been positioned as desired, imaging apparatus 500 is rotated to generate the 2D tomographic image. In one method, imaging apparatus 500 may be rotated at a speed of 10-16 revolutions per minute. Generally, the slower the apparatus is moved along the casing or rotated, the more accurate the photon counts. Additionally, imaging apparatus 500 may be moved up and down wellbore 504 to generate 3D images. The backscattered photon count data may be saved to a memory disk onboard imaging apparatus 500 and processed in-situ using circuitry/image processing unit onboard imaging apparatus 500, or transmitted to the surface via cable 502 for well site processing. A processing facility 508 collects the data from imaging apparatus 500, and may include circuitry 510 for processing and storing the data received from imaging apparatus 500.

Accordingly, the illustrative embodiments and methods described herein employ Compton scattering to overcome limitations of prior art cement evaluation tools. Due to its nature, the disclosed imaging apparatuses provide a number of advantages including, for example, 1) the micro-annulus or coated casing will not adversely affect the photon count measurements; 2) inspection of cement behind thick walled casing is provided when appropriate photon energy is selected; 3) the slant-hole or pin-hole detector collimator design reveals radial locations of defects in the 2D tomographic images of the borehole; and 4) simple processing and interpretation of measured data to cement quality evaluation is provided.

Embodiments and methods described herein further relate to any one or more of the following paragraphs:

1. An apparatus for downhole photon imaging, comprising a photon source that emits photons; a first detector module comprising a plurality of photon detectors to detect photons and produce a signal in response to the received photons, wherein each detector is positioned to correspond to a different depth of investigation; a first detector collimator coupled to the detectors to allow backscattered photons at a pre-determined angle to be detected by the detectors; and an image processing unit that generates an image of a wellbore surrounding the apparatus based upon the signal.

2. An apparatus as defined in paragraph 1, wherein the first detector collimator comprises a plurality of slant holes positioned at an angle in relation to an axis of the apparatus, wherein each slant hole is positioned to direct backscattered photons to a single detector in the first detector module.

3. An apparatus as defined in paragraphs 1 or 2, wherein the detector collimator comprises a pin hole positioned to direct backscattered photons to all detectors in the first detector module.

4. An apparatus as defined in any of paragraphs 1-3, wherein the first detector module is positioned above the photon source; and the apparatus further comprises a second detector module positioned below the photon source, the second detector module comprising a plurality of photon detectors to detect photons and produce a signal in response to the received photons, wherein each detector of the second detector module is positioned to correspond to a different depth of investigation; and a second detector collimator coupled to the detectors of the second detector module to allow backscattered photons at a pre-determined angle to be detected.

5. An apparatus as defined in any of paragraphs 1-4, wherein the image processing unit is a two-dimensional tomographic image processing unit.

6. An apparatus as defined in any of paragraphs 1-5, wherein the first detector collimator is configured to accept photons having single Compton backscattering.

7. An apparatus as defined in any of paragraphs 1-6, wherein the photon source emits photons at one or more energy levels, or over a range of energy levels.

8. An apparatus as defined in any of paragraphs 1-7, wherein the photon source is a chemical source, induced gamma-rays from neutron activation, or an electronic source.

9. An apparatus as defined in any of paragraphs 1-8, wherein the image of the wellbore is a defect in cement behind a casing.

10. A method for downhole photon imaging, comprising (i) emitting photons from a photon source, wherein the photons are backscattered from a region of interest surrounding a wellbore; (ii) receiving the backscattered photons within a first detector collimator positioned at a pre-determined angle; (iii) directing the backscattered photons through the first detector collimator and onto a first detector module comprising a plurality of photon detectors; (iv) detecting the backscattered photons using the detectors, whereby a signal is generated; and (v) utilizing the signal to generate an image of the region of interest.

11. A method as defined in paragraph 10, wherein receiving the backscattered photons within the first detector collimator comprises receiving the backscattered photons through a plurality of slant holes, wherein each slant hole is positioned to direct backscattered photons to a single detector; and directing the backscattered photons through the slant holes and to the detectors.

12. A method as defined in paragraphs 10-11, wherein receiving the backscattered photons within the first detector collimator comprises: receiving the backscattered photons through a pin hole; and directing the backscattered photons to each detector of the first detector module.

13. A method as defined in any of paragraphs 10-12, wherein generating the image comprises generating a two-dimensional tomographic image.

14. A method as defined in any of paragraphs 10-13, wherein generating the image further comprises rotating the apparatus; and repeating (i)-(v).

15. A method as defined in any of paragraphs 10-14, further comprising moving the apparatus along the wellbore to generate a three-dimensional tomographic image of the region of interest.

16. A method as defined in any of paragraphs 10-15, wherein generating the image comprises generating an image of a defect in cement behind casing.

17. A method as defined in any of paragraphs 10-16, wherein receiving the backscattered photons into the first detector collimator comprises receiving photons having single Compton backscattering.

18. A method as defined in any of paragraphs 10-17, further comprising receiving backscattered photons within a second detector collimator positioned at a pre-determined angle;
directing the backscattered photons through the second detector collimator and onto a second detector module comprising a plurality of photon detectors; detecting the backscattered photons using the detectors of the second detector module, whereby a second signal is generated; and utilizing the second signal to generate an image of the region of interest.

19. A method as defined in any of paragraphs 10-18, wherein generating the image comprises obtaining a radial spectrum of the region of interest using the signal; obtaining a reference spectrum of the region of interest; normalizing the radial spectrum using the reference spectrum; and generating the image using the normalized radial spectrum.

20. A method as defined in any of paragraphs 10-19, wherein the apparatus is positioned along a logging, drilling, or wireline assembly.

Although various embodiments and methodologies have been shown and described, the disclosure is not limited to such embodiments and methodologies and will be understood to include all modifications and variations as would be apparent to one skilled in the art. For example, although described herein within relation to downhole applications, the imaging apparatus may be utilized in a variety of other applications, such as pipe inspection, inspection of region behind a barrier and one-sided non-destructive inspection. Therefore, it should be understood that embodiments of the disclosure are not intended to be limited to the particular forms disclosed. Rather, the intention is to cover all modifications, equivalents and alternatives falling within the spirit and scope of the disclosure as defined by the appended claims.

What is claimed is:

1. An apparatus for downhole photon imaging, comprising:
   a photon source that emits photons;
   a first detector module positioned above the photon source, the first detector module comprising a plurality of photon detectors to detect photons and produce a signal in response to the received photons, wherein each detector is positioned to correspond to a different depth of investigation;
   a first detector collimator coupled to the detectors to allow backscattered photons at a pre-determined angle to be detected by the detectors of the first detector module;
   a second detector module positioned below the photon source, the second detector module comprising a plurality of photon detectors to detect photons and produce a signal in response to the received photons, wherein each detector of the second detector module is positioned to correspond to a different depth of investigation;
   a second detector collimator coupled to the detectors of the second detector module to allow backscattered photons at a pre-determined angle to be detected by the second detector module; and
   an image processing unit that generates an image of a wellbore surrounding the apparatus based upon the signal produced by the detectors of at least one of the first detector module or the second detector module.

2. An apparatus as defined in claim 1, wherein the first detector collimator comprises a plurality of slant holes positioned at an angle in relation to an axis of the apparatus, wherein each slant hole is positioned to direct backscattered photons to a single detector in the first detector module.

3. An apparatus as defined in claim 1, wherein the detector collimator comprises a pin hole positioned to direct backscattered photons to all detectors in the first detector module.

4. An apparatus as defined in claim 1, wherein the image processing unit is a two-dimensional tomographic image processing unit.

5. An apparatus as defined in claim 1, wherein the first detector collimator is configured to accept photons having single Compton backscattering.

6. An apparatus as defined in claim 1, wherein the photon source emits photons at one or more energy levels, or over a range of energy levels.

7. An apparatus as defined in claim 1, wherein the photon source is a chemical source, induced gamma-rays from neutron activation, or an electronic source.

8. An apparatus as defined in claim 1, wherein the image of the wellbore is a defect in cement behind a casing.

9. A method for downhole photon imaging, comprising:
   (i) emitting photons from a photon source, wherein the photons are backscattered from a region of interest surrounding a wellbore;
   (ii) receiving the backscattered photons within a first detector collimator positioned at a pre-determined angle;
   (iii) directing the backscattered photons through the first detector collimator and onto a first detector module, the first detector module comprising a plurality of photon detectors to detect the backscattered photons and generate a first signal;
   (iv) receiving the backscattered photons within a second detector collimator positioned at a pre-determined angle;
   (v) directing the backscattered photons through the second detector collimator and onto a second detector module, the second detector module comprising a plurality of photon detectors to detect the backscattered photons and generate a second signal; and
   (vi) utilizing at least one of first signal or the second signal to generate an image of the region of interest.

10. A method as defined in claim 9, wherein receiving the backscattered photons within the first detector collimator comprises:

receiving the backscattered photons through a plurality of slant holes, wherein each slant hole is positioned to direct backscattered photons to a single detector; and directing the backscattered photons through the slant holes and to the detectors.

11. A method as defined in claim 9, wherein receiving the backscattered photons within the first detector collimator comprises:

receiving the backscattered photons through a pin hole; and directing the backscattered photons to each detector of the first detector module.

12. A method as defined in claim 9, wherein the image is a two-dimensional tomographic image generated by an imaging apparatus.

13. A method as defined in claim 12, wherein utilizing further comprises:

rotating the imaging apparatus; and repeating (i)-(vi) to generate the image as the imaging apparatus is rotated.

14. A method as defined in claim 13, further comprising moving the imaging apparatus along the wellbore to generate a three-dimensional tomographic image of the region of interest.

15. A method as defined in claim 9, wherein generating the image comprises generating an image of a defect in cement behind casing.

16. A method as defined in claim 9, wherein the backscattered photons received by the first detector collimator are photons having single Compton backscattering.

17. A method as defined in claim 9, wherein generating the image comprises:

obtaining a radial spectrum of the region of interest using at least one of the first signal or the second signal;

obtaining a reference spectrum of the region of interest;

normalizing the radial spectrum using the reference spectrum; and generating the image using the normalized radial spectrum.

18. A method as defined in claim 12, wherein the imaging apparatus is positioned along a logging, drilling, or wireline assembly.

* * * * *